US010532339B2

(12) United States Patent
Lu

(10) Patent No.: US 10,532,339 B2
(45) Date of Patent: Jan. 14, 2020

(54) COMPOSITIONS AND METHODS FOR CALCINING DIATOMACEOUS EARTH WITH REDUCED CRISTOBALITE AND/OR REDUCED BEER SOLUBLE IRON

(71) Applicant: Imerys Filtration Minerals, Inc., San Jose, CA (US)

(72) Inventor: Jie Lu, Lompoc, CA (US)

(73) Assignee: Imerys USA, Inc., Roswell, GA (US)

(\*) Notice: Subject to any disclaimer, the term of this patent is extended or adjusted under 35 U.S.C. 154(b) by 0 days.

(21) Appl. No.: 15/577,506

(22) PCT Filed: May 25, 2016

(86) PCT No.: PCT/US2016/034152
§ 371 (c)(1),
(2) Date: Nov. 28, 2017

(87) PCT Pub. No.: WO2016/196137
PCT Pub. Date: Dec. 8, 2016

(65) Prior Publication Data
US 2018/0147553 A1 May 31, 2018

Related U.S. Application Data

(60) Provisional application No. 62/171,064, filed on Jun. 4, 2015.

(51) Int. Cl.
*B01J 21/04* (2006.01)
*B01J 21/16* (2006.01)
(Continued)

(52) U.S. Cl.
CPC ............ *B01J 20/14* (2013.01); *B01J 20/043* (2013.01); *B01J 20/06* (2013.01); *B01J 20/08* (2013.01);
(Continued)

(58) Field of Classification Search
CPC . B01J 21/04; B01J 21/16; B01J 20/043; B01J 20/06; B01J 20/08; B01J 20/106; B01J 20/12; B01J 20/14; B01J 20/2803; B01J 20/2859; B01J 20/28076; B01J 20/28085; B01J 20/283; B01J 20/3078
See application file for complete search history.

(56) References Cited

U.S. PATENT DOCUMENTS 5,179,062 A 1/1993 Dufour
5,776,353 A † 7/1998 Palm
(Continued)

FOREIGN PATENT DOCUMENTS

CN 102039118 A 5/2011
CN 102698785 A 10/2012
(Continued)

OTHER PUBLICATIONS

Supplementary European Search Report dated Jan. 21, 2019, in corresponding EP application No. 16804036.8, 7 pages.
(Continued)

*Primary Examiner* — Cam N. Nguyen
(74) *Attorney, Agent, or Firm* — Finnegan, Henderson, Farabow, Garrett & Dunner, LLP

(57) ABSTRACT

A method for calcining diatomaceous earth may include adding at least one lattice interfering agent to the diatomaceous earth to form a composite material. The method may further include heating the composite material at a temperature of at least about 800° C. for at least about 15 minutes to form an at least partially calcined composite material. The at least one lattice interfering agent may include at least one cation of at least one of aluminum and titanium. A diatomaceous earth product may include the at least partially calcined composite material formed from the above-noted method for calcining diatomaceous earth. A filter aid may include the diatomaceous earth product.

14 Claims, 6 Drawing Sheets

(51) Int. Cl.
*B01J 20/04* (2006.01)
*B01J 20/06* (2006.01)
*B01J 20/08* (2006.01)
*B01J 20/10* (2006.01)
*B01J 20/12* (2006.01)
*B01J 20/14* (2006.01)
*B01J 20/28* (2006.01)
*B01J 20/283* (2006.01)
*B01J 20/30* (2006.01)
*C12H 1/07* (2006.01)

(52) U.S. Cl.
CPC ............ *B01J 20/106* (2013.01); *B01J 20/12* (2013.01); *B01J 20/283* (2013.01); *B01J 20/3078* (2013.01); *C12H 1/063* (2013.01); *B01J 2220/52* (2013.01)

(56) References Cited

U.S. PATENT DOCUMENTS

| | | | |
|---|---|---|---|
| 6,524,489 | B1 † | 2/2003 | Palm |
| 8,663,475 | B2 | 3/2014 | Lu |
| 9,707,538 | B2 * | 7/2017 | Kaledin .................. B01J 20/08 |
| 10,105,679 | B2 * | 10/2018 | Wang ................. B01J 20/28059 |
| 2014/0011253 | A1 | 1/2014 | Kshirsagar et al. |
| 2014/0371061 | A1 | 12/2014 | Riley |
| 2015/0190778 | A1 * | 7/2015 | Wang ................. B01J 20/28059 |
| | | | 210/502.1 |

FOREIGN PATENT DOCUMENTS

| | | |
|---|---|---|
| JP | 07-100314 A | 4/1995 |
| WO | 2014/193487 A1 † | 12/2014 |
| WO | 2015/069393 A1 † | 5/2015 |
| WO | 2015/069432 A1 † | 5/2015 |

OTHER PUBLICATIONS

International Search Report and Written Opinion dated Aug. 22, 2016, in International Application No. PCT/US2016/034152 (10 pgs.).

* cited by examiner
† cited by third party

COMPOSITIONS AND METHODS FOR CALCINING DIATOMACEOUS EARTH WITH REDUCED CRISTOBALITE AND/OR REDUCED BEER SOLUBLE IRON

CLAIM OF PRIORITY

This application is a U.S. national phase entry of International Application No. PCT/US2016/034152, filed May 25, 2016, which claims the benefit of priority of U.S. Provisional Application No. 62/171,064, filed Jun. 4, 2015, to both of which this application claims the benefit of priority, and the entirety of the subject matter of both of which is incorporated herein by reference.

FIELD OF THE DESCRIPTION

This disclosure is related to compositions and methods for calcining diatomaceous earth, and more particularly, to compositions and methods for calcining diatomaceous earth resulting in reduced cristobalite and/or beer soluble iron.

BACKGROUND

Diatomaceous earth products may be obtained from diatomaceous earth (also called "DE" or "diatomite"), which is generally known as a sediment-enriched in biogenic silica (i.e., silica produced or brought about by living organisms) in the form of siliceous skeletons (frustules) of diatoms. Diatoms are a diverse array of microscopic, single-celled, golden-brown algae generally of the class Bacillariophyceae that possess an ornate siliceous skeleton of varied and intricate structures including two valves that, in the living diatom, fit together much like a pill box.

Diatomaceous earth may form from the remains of water-borne diatoms and, therefore, diatomaceous earth deposits may be found close to either current or former bodies of water. Those deposits are generally divided into two categories based on source: freshwater and saltwater. Freshwater diatomaceous earth is generally mined from dry lakebeds and may be characterized as having a low crystalline silica content and a high iron content. In contrast, saltwater diatomaceous earth is generally extracted from oceanic areas and may be characterized as having a high crystalline silica content and a low iron content.

In the field of fluid filtration, diatomaceous earth may be employed as a filter aid, and methods of particle separation from fluids may employ diatomaceous earth products as filter aids. The intricate and porous structure unique to diatomaceous earth may, in some instances, be effective for the physical entrapment of particles in filtration processes. It is known to employ diatomaceous earth products to improve the clarity of fluids that exhibit "turbidity" or contain suspended particles or particulate matter. "Turbidity" is the cloudiness or haziness of a fluid, where the haze may be caused by individual particles that are suspended in the fluid. Materials that may cause a fluid to be turbid include, for example, clay, silt, organic matter, inorganic matter, and microscopic organisms.

When diatomaceous earth products are used, for example, as filter aids, it may be desirable to heat treat the natural diatomaceous earth in order to reduce the amount of naturally occurring organics and/or volatiles remaining in the natural diatomaceous earth. However, heat treatment may result in an increase of the cristobalite form of the silica present in naturally occurring diatomaceous earth, particularly when the diatomaceous earth is heat treated at temperatures above, for example, 1000° C. The presence of a significant amount of cristobalite is generally undesirable in uses such as filter aids due to its potentially unhealthy properties in higher concentrations. Thus, it may be desirable to provide compositions and methods for heat treating diatomaceous earth that do not result in significant formation of cristobalite in the diatomaceous earth product.

In addition, when diatomaceous earth products are used, for example, as filter aids, it may be desirable to reduce the level of soluble metal present. As used herein, the term "soluble metal" refers to any metal that may be dissolved in at least one liquid. Soluble metals may include, but are not limited to, iron, aluminum, calcium, vanadium, chromium, copper, zinc, nickel, cadmium, and mercury. For example, when a filter aid including a diatomaceous earth product used to filter at least one liquid, at least one soluble metal may dissociate from the diatomaceous earth filter aid and enter the liquid. In many applications, such an increase in metal content of the liquid may be undesirable and/or unacceptable. For example, when a filter aid including diatomaceous earth is used to filter beer, a high level of iron dissolved in the beer from the filter aid may adversely affect sensory or other properties, including but not limited to, taste and shelf-life. Thus, it may be desirable to provide compositions and methods for heat treating diatomaceous earth that do not result in significant amounts of soluble metal in the diatomaceous earth product.

In many filtration applications, a filtration device may include a filter element, such as a septum, and a filter-aid material. The filter element may be of any form such that it may support a filter-aid material. For example, the filter element may include a cylindrical tube or wafer-like structure covered with a plastic or metal fabric of sufficiently fine weave. The filter element may be a porous structure with a filter element void to allow material of a certain size to pass through the filtration device. The filter-aid material may include one or more filtration components, which, for example, may be inorganic powders or organic fibrous materials. Such a filter-aid material may be used in combination with a filter element to enhance filtration performance.

For example, the filter-aid material may initially be applied to a septum of a filter element in a process known as "pre-coating." Pre-coating may generally involve mixing a slurry of water and filter-aid material, and introducing the slurry into a stream flowing through the septum. During this process, a thin layer, such as, for example, a layer of about 1.5 mm to about 3.0 mm thickness, of filter-aid material may eventually be deposited on the septum, thus forming the filtration device.

During filtration of a fluid, various insoluble particles in the fluid may become trapped by the filter-aid material. The combined layers of filter-aid material and particles and/or constituents to be removed accumulate on the surface of the septum. Those combined layers are known as "filter cake."

As more particles and/or constituents are deposited on the filter cake, the filter cake may become saturated with debris to the point where fluid is no longer able to pass through the septum.

To combat this situation, a process known as "body feeding" may be used. Body feeding is the process of introducing additional filter-aid material into the fluid to be filtered before the fluid reaches the filter cake. The filter-aid material will follow the path of the unfiltered fluid and will eventually reach the filter cake. Upon reaching the filter cake, the added filter-aid material will bind to the cake in a similar manner to how the filter-aid material is bound to the septum during the pre-coating process. The additional layer of filter-aid material may cause the filter cake to swell and thicken, and may increase the capacity of the filter cake to entrap additional debris. The filter aid typically has an open porous structure, which maintains an open structure in the filter cake, thus ensuring continued permeability of the filter cake.

SUMMARY

In accordance with a first aspect, a method for calcining diatomaceous earth may include adding at least one lattice interfering agent to the diatomaceous earth to form a composite material. The method may further include heating the composite material at a temperature of at least about 800° C. for at least about 15 minutes to form an at least partially calcined composite material. The at least one lattice interfering agent may include at least one cation of at least one of aluminum and titanium.

As used herein, "lattice interfering agent" may refer to any substance that suppresses the formation of a lattice or crystal structure of silica associated with cristobalite." For example, "lattice interfering agent" may refer to any substance that interferes with the lattice charges and/or the lattice bond length, so that the formation of cristobalite is suppressed. Because the surface charges may be altered by the "lattice interfering agent," the bonding strength of surfaces with soluble metals, which usually appear as impurities, may be enhanced, so that the soluble metals may be reduced. For example, the at least one lattice interfering agent may include at least one cation of at least one of aluminum and titanium, such as, for example, at least one of alumina, nepheline syenite, perlite, kaolin, bauxite, feldspar, clays, titanium oxides, and other natural and synthetic aluminum-containing and titanium-containing compounds.

According to a further aspect, a diatomaceous earth product may include the at least partially calcined composite material formed from the above-noted method for calcining diatomaceous earth. According to yet another aspect, a filter aid may include the diatomaceous earth product.

According to still a further aspect, a method for calcining diatomaceous earth may include adding at least one lattice interfering agent to the diatomaceous earth to form a composite material. The method may further include heating the composite material at a temperature of at least about 800° C. for at least about 15 minutes to form an at least partially calcined composite material. The at least one lattice interfering agent may include at least one cation of aluminum.

It is to be understood that both the foregoing general description and the following detailed description are exemplary and explanatory only and are not restrictive of the invention, as claimed.

DESCRIPTION OF EXEMPLARY EMBODIMENTS

Figure 1:
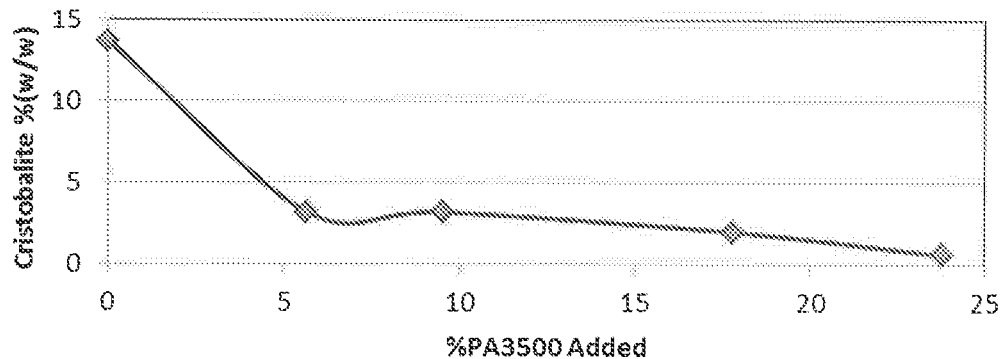
FIG. 1 is a graph showing the effect of fine perlite ore on cristobalite formation when heat treating exemplary diatomaceous earth samples.

According to some embodiments, a method for calcining diatomaceous earth may include adding at least one lattice interfering agent to the diatomaceous earth to form a composite material. The method may further include heating the composite material at a temperature of at least about 800° C. for at least about 15 minutes to form an at least partially calcined composite material. The at least one lattice interfering agent may include at least one cation of at least one of aluminum and titanium. For example, the at least one lattice interfering agent may include at least one of alumina, nepheline syenite, perlite, kaolin, bauxite, feldspar, and clays. According to some embodiments, the at least one lattice interfering agent may include at least one titanium oxide.

According to some embodiments, the method may further include mixing the at least one lattice interfering agent and the diatomaceous earth. According to some embodiments, the at least one lattice interfering agent and the diatomaceous earth are in dry particulate form during the mixing. According to some embodiments, the at least one lattice interfering agent and the diatomaceous earth are mixed in the presence of a fluid including, for example, water and/or dispersants.

According to some embodiments, the composite material is not spray-dried before heating. According to some embodiments, the composite material is spray-dried before heating.

According to some embodiments, the at least one lattice interfering agent ranges from 1 wt % to 50 wt % of the composite material. For example, the at least one lattice interfering agent ranges from 5 wt % to 30 wt % of the composite material, from 10 wt % to 25 wt % of the composite material, from 15 wt % to 20 wt % of the composite material, from 20 wt % to 25 wt % of the composite material, from 20 wt % to 50 wt % of the composite material, or from 20 wt % to 30 wt % of the composite material.

According to some embodiments, the at least partially calcined composite material includes less than 15 wt % cristobalite. For example, the at least partially calcined composite material may include less than 12 wt % cristobalite, less than 11 wt % cristobalite, less than 10 wt % cristobalite, less than 8 wt % cristobalite, less than 6 wt % cristobalite, less than 5 wt % cristobalite, less than 4 wt % cristobalite, less than 3 wt % cristobalite, less than 2 wt % cristobalite, or less than 1 wt % cristobalite.

According to some embodiments, diatomaceous earth calcined according to the exemplary methods disclosed herein may result in formation of a reduced amount of cristobalite relative to conventional diatomaceous earth calcination methods. Calcination of diatomaceous earth normally leads to the formation of cristobalite, especially when the diatomaceous earth is calcined under high temperatures, such as, for example, temperatures greater than 1,000° C. and/or in the presence of alkali flux agents, such as, for example, soda ash. Without wishing to be bound by theory, it is believed that during the solid phase transition, or during the formation of crystalline phases at high temperature (and/or high pressure), high valence cations, such as, for example, $Al^{3+}$ and/or $Ti^{4+}$, tend to migrate into the framework structure and interfere with the build-up of certain crystals during calcination. In contrast, during calcination of silica or silicate materials, the presence of alkali metal ions, such as, for example, $Na^+$ and $K^+$, tends to increase the formation of cristobalite. However, it is believed that when a sufficient amount of the high valence cations are present during calcination, and under a proper range of temperatures (e.g., from about 1,000° C. to about 1,200° C.), the formation of the cristobalite is suppressed because the lattice interfering agent(s) interfere with the development of the cristobalite lattice structure. This may result from the different charges and bond lengths of the interfering agents (e.g., $AlO_4$ and $TiO_4$), which may distort the development of the cristobalite lattice structure, which is believed to lead to the suppression of cristobalite formation in the calcined diatomaceous earth. Exemplary lattice interfering agents include, but are not limited to, cations of at least one of aluminum and titanium, such as, for example, alumina, nepheline syenite, perlite, kaolin, bauxite, feldspar, clays, and titanium oxides.

According to some embodiments, the at least partially calcined composite material includes a beer soluble iron content of less than 100 parts per million as measured according to the European Brewing Convention (EBC) method. For example, the at least partially calcined composite material may include a beer soluble iron content of less than 75 parts per million, less than 60 parts per million, less than 50 parts per million, less than 35 parts per million, less than 30 parts per million, or less than 25 parts per million, as measured according to the EBC method.

Any appropriate protocol or test for measuring levels of at least one soluble metal in composite materials may be used to determine the amount of beer soluble iron present, including those now known to the skilled artisan or hereafter discovered. For example, there are two well-known methods for measuring beer soluble iron (BSI) of composite material filter aids. BSI refers to the iron content, which may be measured in parts per million, of a filter aid including a material that dissociates in the presence of a liquid, such as beer. The European Beverage Convention (EBC) measurement method contacts liquid potassium hydrogen phthalate with the filter aid and then analyzes the liquid for iron content. More specifically, the EBC method uses, for example, a 10 g/L solution of potassium hydrogen phthalate (KHP, $KHC_8H_4O_4$) as the extractant along with a given quantity of filter aid material, with a total contact time of two hours. Extracts are then analyzed for iron concentration by the FERROZINE.

The second measurement method is the method of the American Society of Brewing Chemists (ASBC). In the ASBC method, a sample of BUDWEISER® beer is contacted with the filter aid, and the resulting iron content in the beer is measured. For example, BSI content may be measured by placing a 5 gram sample of diatomaceous earth in 200 mL of decarbonated beer (for example, BUDWEISER®) at room temperature, and the mixture is swirled intermittently for an elapsed time of 5 minutes and 50 seconds. The mixture is then immediately transferred to a funnel containing 25 cm diameter filter paper, from which the filtrate collected during the first 30 seconds is discarded. Additional filtrate is collected for the next 150 seconds, and a 25 mL portion is treated with approximately 25 mg of ascorbic acid (i.e., $C_6H_8O_6$) to reduce dissolved iron ions to the ferrous (i.e., $Fe^{2+}$) state (thus yielding a "sample extract"). The color is developed by addition of 1 mL of 0.3% (w/v) 1,10-phenanthroline, and after 30 minutes, the absorbance of the resulting sample solution is compared to a standard calibration curve. The calibration curve is prepared from standard iron solutions of known concentration in beer. Untreated filtrate is used as a method blank to correct for turbidity and color. Absorbance is measured at 505 nm using a spectrophotometer. In addition, some skilled in the art have also developed their own methods, such as, for example, the HEINEKEN® BSI method, which uses HEINEKEN® beer and extract for two hours.

According to some embodiments, diatomaceous earth calcined according to the exemplary methods disclosed herein may result in a reduced amount of beer soluble iron as measured by the EBC method relative to conventional diatomaceous earth calcination methods. A conventional water treatment method may be used to reduce BSI of straight calcined filter aids, but has little BSI reduction effect when BSI is measured according to the EBC method. In addition, the water treatment method has little BSI reduction effects on flux-calcined filter aids. A phosphate addition method may help to reduce BSI measured according to the EBC method, but this method has no effect on the BSI as measured according to the ASBC method.

According to some embodiments of the diatomaceous earth calcination methods disclosed herein, mixing certain amounts of one or more additives containing a high aluminum content, such as, for example, perlite (e.g., fine perlite ore waste), nepheline syenite, and similar materials, such as those previously identified herein as being lattice interfering agents, may surprisingly result in reduction of both the ASBC- and EBC-measured BSI.

Without wishing to be bound by theory, it is believed that the mechanism of using lattice interfering agents to reduce BSI is understood as follows: when the high valence, lattice interfering agents, such as, for example, $Al^{3+}$, is calcined with a diatomaceous earth feed, it may create more negatively charged surfaces, and such negative charges may help to hold surface iron more strongly, thus leading to lower BSI under both the EBC and ASBC measurement methods.

According to some embodiments, the method for calcining diatomaceous earth may include heating the composite material at a temperature of at least about 1,000° C. for at least about 15 minutes to form the at least partially calcined composite material. For example, heating the composite material may include heating the composite material at a temperature ranging from about 1,000° C. to about 1,200° C. for at least about 15 minutes, heating the composite material at a temperature ranging from about 1,000° C. to about 1,200° C. for at least about 20 minutes, heating the composite material at a temperature ranging from about 1,000° C. to about 1,200° C. for at least about 25 minutes, or heating the composite material at a temperature ranging from about 1,000° C. to about 1,200° C. for at least about 30 minutes to form the at least partially calcined composite material.

A diatomaceous earth product may include the at least partially calcined composite material formed according to any of the methods disclosed herein. For example, the diatomaceous earth product may include an at least partially calcined composite material formed by adding at least one lattice interfering agent to a diatomaceous earth to form the composite material, and heating the composite material at a temperature of at least about 800° C. for at least about 15 minutes to form the at least partially calcined composite material. The at least one lattice interfering agent may include at least one cation of at least one of aluminum and titanium. For example, the at least one lattice interfering agent may include at least one of alumina, nepheline syenite, perlite, kaolin, bauxite, feldspar, and clays, and other aluminum-containing compounds. According to some embodiments, the at least one lattice interfering agent may include at least one titanium oxide.

For example, the at least one lattice interfering agent of the diatomaceous earth product may range from 1 wt % to 50 wt % of the composite material. For example, the at least one lattice interfering agent may range from 5 wt % to 30 wt % of the composite material, from 10 wt % to 25 wt % of the composite material, from 15 wt % to 20 wt % of the composite material, from 20 wt % to 25 wt % of the composite material, from 20 wt % to 50 wt % of the composite material, or from 20 wt % to 30 wt % of the composite material.

According to some embodiments, the at least partially calcined composite material of the diatomaceous earth product may include less than 15 wt % cristobalite. For example, the at least partially calcined composite material may include less than 12 wt % cristobalite, less than 11 wt % cristobalite, less than 10 wt % cristobalite, less than 8 wt % cristobalite, less than 6 wt % cristobalite, less than 5 wt % cristobalite, less than 4 wt % cristobalite, less than 3 wt % cristobalite, less than 2 wt % cristobalite, or less than 1 wt % cristobalite.

A filter aid may include any of the diatomaceous earth products disclosed herein. For example, the diatomaceous earth product of the filter aid may include an at least partially calcined composite material formed by adding at least one lattice interfering agent to a diatomaceous earth to form the composite material, and heating the composite material at a temperature of at least about 800° C. for at least about 15 minutes to form the at least partially calcined composite material. The at least one lattice interfering agent may include at least one cation of at least one of aluminum and titanium. For example, the at least one lattice interfering agent may include at least one of alumina, nepheline syenite, perlite, kaolin, bauxite, feldspar, and clays. According to some embodiments, the at least one lattice interfering agent may include at least one titanium oxide.

For example, the diatomaceous earth product of the filter aid may include the at least one lattice interfering agent in a range from 1 wt % to 50 wt % of the composite material. For example, the at least one lattice interfering agent may range from 5 wt % to 30 wt % of the composite material, from 10 wt % to 25 wt % of the composite material, from 15 wt % to 20 wt % of the composite material, from 20 wt % to 25 wt % of the composite material, from 20 wt % to 50 wt % of the composite material, or from 20 wt % to 30 wt % of the composite material.

According to some embodiments, the at least partially calcined composite material of the filter aid may include less than 15 wt % cristobalite. For example, the at least partially calcined composite material may include less than 12 wt % cristobalite, less than 11 wt % cristobalite, less than 10 wt % cristobalite, less than 8 wt % cristobalite, less than 6 wt % cristobalite, less than 5 wt % cristobalite, less than 4 wt % cristobalite, less than 3 wt % cristobalite, less than 2 wt % cristobalite, or less than 1 wt % cristobalite.

According to some embodiments, a filter aid including the diatomaceous earth including the at least partially calcined composite may have a permeability in a range from 0.1 to 20 darcys, such as, for example, from 0.1 to 10 darcys, from 0.1 to 5 darcys, or from 0.1 to 3 darcys.

According to some embodiments, the diatomaceous earth may be obtained from a freshwater source or a saltwater source.

According to some embodiments, the filter aid may have a $d_{10}$ in a range from 5 to 30 microns. According to some embodiments, the filter aid may have a $d_{50}$ in a range from 15 to 70 microns. According to some embodiments, the filter aid may have a $d_{90}$ in a range from 50 to 200 microns.

According to some embodiments, the diatomaceous earth product may have a $d_{10}$ in a range from 3 to 15 microns. According to some embodiments, the diatomaceous earth product may have a $d_{50}$ in a range from 10 to 70 microns. According to some embodiments, the diatomaceous earth product may have a $d_{90}$ in a range from 30 to 130 microns.

According to some embodiments, the filter aid may have a BET surface area in a range from 1 $m^2/g$ to 50 $m^2/g$. According to some embodiments, the filter aid may have a median pore size in a range from 1 to 35 microns, such as, for example, from 1 to 20 microns, from 1 to 10 microns, from 3 to 10 microns, or from 3 to 5 microns. According to some embodiments, the pore volume of the filter aid may range from 2 to 7 mL/g.

According to some embodiments, the filter aid may have a beer soluble calcium content of less than 200 ppm, as measured by EBC. For example, the filter aid may have a beer soluble calcium content of less than 150 ppm, less than 100 ppm, less than 50 ppm, less than 30 ppm, or less than 15 ppm, as measured by EBC.

According to some embodiments, the filter aid may have a beer soluble aluminum content of less than 30 ppm, as measured by EBC. For example, the filter aid may have a beer soluble aluminum content of less than 20 ppm, less than 15 ppm, or less than 10 ppm, as measured by EBC.

According to some embodiments, the filter aid may have a beer soluble arsenic content of less than 5 ppm, as measured by EBC. For example, the filter aid may have a beer soluble arsenic content of less than 2 ppm, less than 1 ppm, less than 0.5 ppm, or less than 0.2 ppm, as measured by EBC.

According to some embodiments, the filter aid may have an acid-soluble iron content of less than 100 mg/kg, as measured by Food Chemicals Codex (FCC) method. For example, the filter aid may have an acid-soluble iron content of less than 50 mg/kg, less than 40 mg/kg, or less than 30 mg/kg, as measured by FCC.

According to some embodiments, the filter aid may have an acid-soluble aluminum content of less than 280 mg/kg, as measured by FCC. For example, the filter aid may have an acid-soluble aluminum content of less than 200 mg/kg, less than 100 mg/kg, or less than 80 mg/kg, as measured by FCC.

According to some embodiments, the filter aid may have an acid-soluble arsenic content of less than 5 mg/kg, as measured by FCC. For example, the filter aid may have an acid-soluble arsenic content of less than 2 mg/kg, less than 1 mg/kg, or less than 0.5 mg/kg, as measured by FCC.

According to some embodiments, the filter aid may have an acid-soluble copper content of less than 5 mg/kg, as measured by FCC. For example, the filter aid may have an acid-soluble copper content of less than 2 mg/kg, less than 1.5 mg/kg, or less than 1 mg/kg, as measured by FCC.

According to some embodiments, the filter aid may have an acid-soluble lead content of less than 1 mg/kg, as measured by FCC. For example, the filter aid may have an acid-soluble lead content of less than 0.5 mg/kg, less than 0.2 mg/kg, or less than 0.1 mg/kg, as measured by FCC.

According to some embodiments, the filter aid may have a wet density in a range from 5 to 30 lbs/ft$^3$, such as, for example, from 10 to 15 lbs/ft$^3$. According to some embodiments, the filter aid may have a wet density less than or equal to 20 lbs/ft$^3$, less than or equal to 15 lbs/ft$^3$, or less than or equal to 10 lbs/ft$^3$.

According to some embodiments, a method for making a composite material includes blending diatomaceous earth and the at least one lattice interfering agent, adding a binder to the blended diatomaceous earth and at least one lattice interfering agent, and forming a composite material from the diatomaceous earth, the at least one lattice interfering agent, and the binder. According to some embodiments, forming the composite material may include precipitating the binder to form the composite material.

According to some embodiments, the method may further include dispersing the binder in water. For example, the method may further include dispersing the binder in water before adding the binder to the blended diatomaceous earth and at least one lattice interfering agent. The method may further include mixing the binder and the blended diatomaceous earth and at least one lattice interfering agent. The method may further include classifying the mixed binder and blended diatomaceous earth and at least one lattice interfering agent. The method may further include drying the mixed binder and blended diatomaceous earth and at least one lattice Interfering agent. For example, the drying may include heating the mixed binder and blended diatomaceous earth and at least one lattice interfering agent to a temperature in a range from 100° C. to 200° C. The method may further include, after drying the mixture, classifying the mixture. The method may further include, prior to blending the diatomaceous earth and at least one lattice interfering agent, calcining the composite material formed by the diatomaceous earth and at least one lattice interfering agent.

According to some embodiments, a method for filtering a liquid may include using a filter aid and/or composite material. The filter aid and/or composite material may include a diatomaceous earth and at least one lattice interfering agent.

According to some embodiments, the method may also include, prior to filtering the liquid, pre-coating a filter structure with the filter aid and/or composite material. Providing the liquid may include adding the filter aid and/or composite material as a body feed in the liquid.

According to some embodiments, the liquid may include a beverage. According to some embodiments, the beverage may include beer, wine, juice, or water.

Processes for preparing the diatomaceous earth products may include providing at least one natural diatomaceous earth as a starting material. For example, the term "natural diatomaceous earth" includes any diatomaceous earth material that has not been subjected to thermal treatment (e.g., calcination) sufficient to induce formation of greater than 1% cristobalite. "Natural diatomaceous earth" may also include diatomaceous earth including uncalcined diatomaceous earth. In some embodiments, the diatomaceous earth may be obtained from a saltwater source. In some embodiments, the diatomaceous earth may be obtained from a freshwater source. In further embodiments, the diatomaceous earth is any diatomaceous earth material that may be capable of use in composite material such as a filter aid, either in its natural form or after subjecting the material to one or more processing steps. In some embodiments, the diatomaceous earth is any diatomaceous earth material that has not been subjected to at least one thermal treatment. In still other embodiments, the diatomaceous earth is any diatomaceous earth material that has not been subjected to calcination. The average particle size for the diatomaceous earth may be in a range from 3 to 200 microns. The BET surface area of the diatomaceous earth may be in a range from 1 to 80 m$^2$/g. The pore volume of the diatomaceous earth may range from 1 to 10 mL/g with median pore size ranging from 1 to 20 microns.

As stated earlier, diatomaceous earth is, in general, a sedimentary biogenic silica deposit including the fossilized skeletons of diatoms, one-celled algae-like plants that accumulate in marine or fresh water environments.

Honeycomb silica structures generally give diatomaceous earth useful characteristics such as absorptive capacity and surface area, chemical stability, and low-bulk density. In some embodiments, diatomaceous earth includes about 90% $SiO_2$ mixed with other substances. In some embodiments, diatomaceous earth includes about 90% $SiO_2$, plus various metal oxides, such as, but not limited to, Al, Fe, Ca, and Mg oxides.

Diatomaceous earth may have any of various appropriate forms now known to the skilled artisan or hereafter discovered. In some embodiments, the diatomaceous earth may undergo one or more of a milling, drying, or air classifying process. In some embodiments, the diatomaceous earth may be subjected to at least one chemical modification process. An example of a chemical modification process is silanization, but other chemical modification processes are contemplated. Silanization may be used to render the surfaces of the at least one diatomaceous earth either more hydrophobic or hydrophilic using the methods appropriate for silicate minerals. Such physical and chemical modification processes may occur before or after an acid-washing step.

According to some embodiments, the diatomaceous earth may include less than or equal to about 10 mg/kg acid-soluble arsenic, less than or equal to about 5 mg/kg acid-soluble arsenic, less than or equal to about 1 mg/kg acid-soluble arsenic, such as, for example, less than or equal to about 0.8 mg/kg acid-soluble arsenic, less than or equal to about 0.7 mg/kg acid-soluble arsenic, less than or equal to about 0.6 mg/kg acid-soluble arsenic, less than or equal to about 0.5 mg/kg acid-soluble arsenic, less than or equal to about 0.4 mg/kg acid-soluble arsenic, less than or equal to about 0.3 mg/kg acid-soluble arsenic, less than or equal to about 0.2 mg/kg acid-soluble arsenic, or less than or equal to about 0.1 mg/kg acid-soluble arsenic. According to some embodiments, the acid-soluble arsenic may be at or below the detection limit of the instrument, which may generally be less than 0.1 mg/kg acid-soluble arsenic or 0.0 mg/kg acid-soluble arsenic.

According to some embodiments, the diatomaceous earth product may include less than or equal to about 1 mg/kg acid-soluble lead. For example, the diatomaceous earth product may include less than or equal to about 0.8 mg/kg acid-soluble lead, less than or equal to about 0.7 mg/kg acid-soluble lead, less than or equal to about 0.6 mg/kg acid-soluble lead, less than or equal to about 0.5 mg/kg acid-soluble lead, less than or equal to about 0.4 mg/kg acid-soluble lead, less than or equal to about 0.3 mg/kg acid-soluble lead, less than or equal to about 0.2 mg/kg acid-soluble lead, or less than or equal to about 0.1 mg/kg acid-soluble lead. According to some embodiments, the acid-soluble lead may be at or below the detection limit of the instrument, which may generally be less than 0.1 mg/kg acid-soluble lead or 0.0 mg/kg acid-soluble lead.

According to some embodiments, the diatomaceous earth product may include less than or equal to about 100 mg/kg acid-soluble aluminum. For example, the diatomaceous earth product may include less than or equal to about 70 mg/kg acid-soluble aluminum, less than or equal to about 60 mg/kg acid-soluble aluminum, less than or equal to about 50 mg/kg acid-soluble aluminum, less than or equal to about 40 mg/kg acid-soluble aluminum, less than or equal to about 30 mg/kg acid-soluble aluminum, less than or equal to about 20 mg/kg acid-soluble aluminum, less than or equal to about 15 mg/kg acid-soluble aluminum, less than or equal to about 10 mg/kg acid-soluble aluminum, less than or equal to about 5 mg/kg acid-soluble aluminum, or less than or equal to about 3 mg/kg acid-soluble aluminum.

According to some embodiments, the diatomaceous earth product may include less than or equal to about 800 mg/kg acid-soluble calcium, such as, for example, less than or equal to about 500 mg/kg acid-soluble calcium, less than or equal to about 400 mg/kg acid-soluble calcium, less than or equal to about 300 mg/kg acid-soluble calcium, less than or equal to about 200 mg/kg acid-soluble calcium, less than or equal to about 150 mg/kg acid-soluble calcium, less than or equal to about 100 mg/kg acid-soluble calcium, less than or equal to about 75 mg/kg acid-soluble calcium, or less than or equal to about 50 mg/kg acid-soluble calcium.

According to some embodiments, the diatomaceous earth product may include less than or equal to about 100 mg/kg acid-soluble iron, such as, for example, less than or equal to about 70 mg/kg acid-soluble iron, less than or equal to about 50 mg/kg acid-soluble iron, less than or equal to about 40 mg/kg acid-soluble iron, less than or equal to about 30 mg/kg acid-soluble iron, less than or equal to about 20 mg/kg acid-soluble iron, less than or equal to about 15 mg/kg acid-soluble iron, less than or equal to about 10 mg/kg acid-soluble iron, less than or equal to about 5 mg/kg acid-soluble iron, or less than or equal to about 3 mg/kg acid-soluble Iron.

According to some embodiments, the diatomaceous earth and at least one lattice interfering agent may be subjected to at least one co-agglomeration with at least one binder. According to some embodiments, the binder may include at least one of an inorganic binder or an organic binder. According to some embodiments, the binder may include an inorganic binder, such as an alkali silica binder, such as, for example, sodium silicate, potassium silicate, and mixtures thereof. According to some embodiments, the inorganic binder may include a cement, such as a calcium aluminate cement. In some embodiments, the inorganic binder may include a cement, such as, for example, a calcium phosphate cement and/or a magnesium phosphate cement. In some embodiments, the inorganic binder may include a magnesium aluminum silicate clay. According to some embodiments, the binder may include a silicone or ethyl silicate.

According to some embodiments, the binder may include one or more organic binders or biopolymers. For example, the binder may include a cellulose, polyethylene glycol (PEG), polyvinyl alcohol (PVA), polyvinylpyrrolidone (PVP), starch, Candalilla wax, a polyacrylate or related copolymer (e.g., acrylic acid-acrylamide, etc.), a polydiallyldimethylammonium chloride polymer or copolymer (pDADMAC, etc.), dextrin, lignosulfonate, sodium alginate, magnesium stearate, and/or mixtures thereof.

Co-agglomeration of the diatomaceous earth, at least one lattice interfering agent, and binder may occur through any appropriate agglomeration processes known to the skilled artisan or hereafter discovered. For example, in some embodiments, co-agglomeration includes preparing at least one aqueous solution of the binder, and contacting the binder solution with a blend of the diatomaceous earth and the at least one lattice interfering agent. One or more agglomerations may be performed, for example, in which multiple silica binders, multiple diatomaceous earths, and/or lattice interfering agents solutions are used.

In some embodiments, contacting includes mixing the binder solution with a blend of the diatomaceous earth and at least one lattice interfering agent. In some embodiments, the mixing includes agitation. In some embodiments, the blend of diatomaceous earth material, at least one lattice interfering agent, and binder solution are mixed sufficiently to at least substantially uniformly distribute the binder solution among the agglomeration points of contact of the diatomaceous earth and at least one lattice interfering agent. In some embodiments, the blend of the diatomaceous earth, at least one lattice interfering agent, and binder solution are mixed with sufficient agitation to at least substantially uniformly distribute the binder solution among the agglomeration points of contact of the blend of diatomaceous earth and at least one lattice interfering agent without damaging the structure of the diatomaceous earth or the at least one lattice interfering agent. In some embodiments, the contacting includes low-shear mixing.

In some embodiments, mixing occurs for about one hour. In other embodiments, mixing occurs for less than about one hour. In further embodiments, mixing occurs for about 30 minutes. In yet other embodiments, mixing occurs for about 20 minutes. In still further embodiments, mixing occurs for about 10 minutes.

In some embodiments, mixing occurs at about room temperature (i.e., from about 20° C. to about 23° C.). In other embodiments, mixing occurs at a temperature ranging from about 20° C. to about 50° C. In further embodiments, mixing occurs at a temperature ranging from about 30° C. to about 45° C. In still other embodiments, mixing occurs at a temperature ranging from about 35° C. to about 40° C.

According to some embodiments, contacting includes spraying the blend of the diatomaceous earth and the at least one lattice interfering agent with a binder solution. In some embodiments, the spraying is intermittent. In other embodiments, the spraying is continuous. In further embodiments, spraying includes mixing the blend of diatomaceous earth and at least one lattice interfering agent while spraying with the binder solution, for example, to expose different agglomeration points of contacts to the spray. In some embodiments, such mixing is intermittent. In other embodiments, such mixing is continuous.

In some embodiments, the binder is present in the binder solution in an amount from less than about 40% by weight, relative to the weight of the binder solution. In some embodiments, the binder may be in a range from about 1% to about 10% by weight of the solution. In further embodiments, the binder may be in a range from about 1% to about 5% by weight of the solution.

The aqueous solution of the binder may be prepared with water. In some embodiments, the water is deionized water. In some embodiments, the water is ultrapure water. In further embodiments, the water has been treated to remove or decrease the levels of metals, toxins, and/or other undesirable elements before it is contacted with the binder.

The amount of the aqueous solution contacted with the blend of diatomaceous earth and at least one lattice interfering agent may range from about 0.25 parts to about 1.5 parts of aqueous solution to one part blend. In some embodiments, about 1 part aqueous solution is contacted with about 1 part blend of the diatomaceous earth and the at least one lattice interfering agent.

Before and/or after the agglomeration, the diatomaceous earth and/or the at least one lattice interfering agent may be subjected to at least one classification step. For example, before and/or after at least one heat treatment, the diatomaceous earth may, in some embodiments, be subjected to at least one classification step. In some embodiments, the particle size of the diatomaceous earth and/or at least one lattice interfering agent may be adjusted to a suitable or desired size using any one of several techniques well known in the art. In some embodiments, the diatomaceous earth material and/or at least one lattice interfering agent may be subjected to at least one mechanical separation to adjust the powder size distribution. Appropriate mechanical separation techniques are well known to the skilled artisan and include, but are not limited to, milling, grinding, screening, extrusion, triboelectric separation, liquid classification, aging, and air classification.

The diatomaceous earth, at least one lattice interfering agent, and/or co-agglomerated diatomaceous earth and at least one lattice interfering agent may be subjected to at least one heat treatment. Appropriate heat treatment processes are well-known to the skilled artisan, and include those now known or that may hereinafter be discovered. In some embodiments, the at least one heat treatment decreases the amount of organics and/or volatiles in the heat-treated diatomaceous earth and/or at least one lattice interfering agent. In some embodiments, the at least one heat treatment includes at least one calcination. In some embodiments, the at least one heat treatment includes at least one flux calcination. In some embodiments, the at least one heat treatment includes at least one roasting.

Calcination may be conducted according to any appropriate process now known to the skilled artisan or hereafter discovered. In some embodiments, calcination is conducted at temperatures below the melting point of the diatomaceous earth and/or at least one lattice interfering agent. In some embodiments, calcination is conducted at a temperature ranging from about 600° C. to about 1100° C. In some embodiments, the calcination temperature ranges from about 600° C. to about 700° C. In some embodiments, the calcination temperature ranges from about 700° C. to about 800° C. In some embodiments, the calcination temperature ranges from about 800° C. to about 900° C. In some embodiments, the calcination temperature is chosen from the group consisting of about 600° C., about 700° C., about 800° C., about 900° C., about 1000° C., and about 1100° C. Heat treatment at a lower temperature may result in an energy savings over other processes for the preparation of diatomaceous earth and/or at least one lattice interfering agent.

Flux calcination includes conducting at least one calcination in the presence of at least one fluxing agent. Flux calcination may be conducted according to any appropriate process now known to the skilled artisan or hereafter discovered. In some embodiments, the at least one fluxing agent is any material now known to the skilled artisan or hereafter discovered that may act as a fluxing agent. In some embodiments, the at least one fluxing agent is a salt including at least one alkali metal. In some embodiments, the at least one fluxing agent is chosen from the group consisting of carbonate, silicate, chloride, and hydroxide salts. In other embodiments, the at least one fluxing agent is chosen from the group consisting of sodium, potassium, rubidium, and cesium salts. In still further embodiments, the at least one fluxing agent is chosen from the group consisting of sodium, potassium, rubidium, and cesium carbonate salts. According to some embodiments, residual metal content from a fluxing agent may be removed by acid washing.

Roasting may be conducted according to any appropriate process now known to the skilled artisan or hereafter discovered. In some embodiments, roasting is a calcination process conducted at a generally lower temperature that helps to avoid formation of crystalline silica in the diatomaceous earth and/or low extractable metal mineral. In some embodiments, roasting is conducted at a temperature in a range from about 450° C. to about 900° C. In some embodiments, the roasting temperature may be in a range from about 500° C. to about 800° C. In some embodiments, the roasting temperature may be in a range from about 600° C. to about 700° C. In some embodiments, the roasting temperature may be in a range from about 700° C. to about 900° C. In some embodiments, the roasting temperature is chosen from the group consisting of about 450° C., about 500° C., about 600° C., about 700° C., about 800° C., and about 900° C.

According to some embodiments, the diatomaceous earth and/or at least one lattice interfering agent may be subjected to at least one heat treatment, followed by co-agglomerating the heat treated diatomaceous earth and/or heat treated at least one lattice interfering agent with at least one binder.

A composite material, such as an agglomerated material made by the processes described herein, may have one or more beneficial attributes, making them desirable for use in one or a number of given applications. In some embodiments, the composite materials may be useful as part of a filter aid. In some embodiments, a filter aid may include at least one composite material.

The filter aids disclosed herein may have a permeability suitable for use in a filter aid composition. Permeability may be measured by any appropriate measurement technique now known to the skilled artisan or hereafter discovered. Permeability is generally measured in darcy units or darcy, as determined by the permeability of a porous bed one cm high and with a one $cm^2$ section through which flows a fluid with a viscosity of one mPa·s with a flow rate of one cm³/sec under an applied pressure differential of one atmosphere. The principles for measuring permeability have been previously derived for porous media from Darcy's law (see, for example, J. Bear, "The Equation of Motion of a Homogeneous Fluid: Derivations of Darcy's Law," in *Dynamics of Fluids in Porous Media* 161-177 (2nd ed. 1988)). An array of devices and methods are in existence that may correlate with permeability. In one exemplary method useful for measuring permeability, a specially constructed device is designed to form a filter cake on a septum from a suspension of filtration media in water, and the time required for a specified volume of water to flow through a measured thickness of filter cake of known cross-sectional area is measured.

In some embodiments, the at least partially calcined composite material has a permeability in a range from about 0.5 darcys to about 20 darcys. In some embodiments, the composite material has a permeability in a range from about 0.5 darcys to about 10 darcys. In some embodiments, the composite material has a permeability in a range from about 0.5 darcys to about 5 darcys. In some embodiments, permeability may be in a range from about 0.5 darcys to about 2 darcys. In some embodiments, the permeability may be in a range from about 1 darcy to about 2 darcys.

The at least partially calcined composite materials, such as the agglomerated materials disclosed herein have a particle size. Particle size may be measured by any appropriate measurement technique now known to the skilled artisan or hereafter discovered. In one exemplary method, particle size and particle size properties, such as particle size distribution ("psd"), are measured using a Leeds and Northrup Microtrac X100 laser particle size analyzer (Leeds and Northrup, North Wales, Pa., USA), which can determine particle size distribution over a particle size range from 0.12 µm to 704 µm. The size of a given particle is expressed in terms of the diameter of a sphere of equivalent diameter that sediments through the suspension, also known as an equivalent spherical diameter or "esd." The median particle size, or $d_{50}$ value, is the value at which 50% by weight of the particles have an esd less than that $d_{50}$ value. The $d_{10}$ value is the value at which 10% by weight of the particles have an esd less than that $d_{10}$ value. The $d_{90}$ value is the value at which 90% by weight of the particles have an esd less than that $d_{90}$ value.

In some embodiments, the $d_{10}$ of the at least partially calcined composite material is in a range from about 5 µm to about 30 µm. In some embodiments, the $d_{10}$ is in a range from about 10 µm to about 30 µm. In some embodiments, the $d_{10}$ is in a range from about 15 µm to about 30 µm. In some embodiments, the $d_{10}$ is in a range from about 20 µm to about 30 µm.

In some embodiments, the $d_{50}$ of the at least partially calcined composite material is in a range from about 15 µm to about 80 µm. In some embodiments, the $d_{50}$ is in a range from about 20 µm to about 80 µm. In some embodiments, the $d_{50}$ is in a range from about 30 µm to about 80 µm. In some embodiments, the $d_{50}$ is in a range from about 40 µm to about 80 µm. In some embodiments, the $d_{50}$ is in a range from about 50 µm to about 80 µm. In some embodiments, the $d_{50}$ is in a range from about 60 µm to about 80 µm.

In some embodiments, the $d_{90}$ of the at least partially calcined composite material is in a range from about 50 µm to about 200 µm. In some embodiments, the $d_{90}$ is in a range from about 60 µm to about 200 µm. In some embodiments, the $d_{90}$ is in a range from about 70 µm to about 200 µm. In some embodiments, the $d_{90}$ is in a range from about 80 µm to about 0 µm. In some embodiments, the $d_{90}$ is in a range from about 90 µm to about 200 µm. In some embodiments, the $d_{90}$ is in a range from about 100 µm to about 200 µm. In some embodiments, the $d_{90}$ is in a range from about 110 µm to about 200 µm. In some embodiments, the $d_{90}$ is in a range from about 120 µm to about 200 µm. In some embodiments, the $d_{90}$ is in a range from about 150 µm to about 200 µm.

The at least partially calcined composite materials disclosed herein may have a low crystalline silica content. Forms of crystalline silica include, but are not limited to, quartz, cristobalite, and tridymite. In some embodiments, the composite material has a lower content of at least one crystalline silica than a composite material not subjected to the calcining methods including the at least one lattice interfering agent disclosed herein.

As mentioned previously, the composite materials disclosed herein may have a low cristobalite content relative to other materials not calcined according to the methods disclosed herein including the at least one lattice interfering agent. Cristobalite content may be measured by any appropriate measurement technique now known to the skilled artisan or hereafter discovered. In one exemplary method, cristobalite content is measured by x-ray diffraction. Cristobalite content may be measured, for example, by the quantitative X-ray diffraction method outlined in H. P. Klug and L. E. Alexander, *X-Ray Diffraction Procedures for Polycrystalline and Amorphous Materials* 531-563 (2nd ed. 1972), which is incorporated by reference herein in its entirety. According to one example of that method, a sample is milled in a mortar and pestle to a fine powder, then back-loaded into a sample holder. The sample and its holder are placed into the beam path of an X-ray diffraction system and exposed to collimated X-rays using an accelerating voltage of 40 kV and a current of 20 mA focused on a copper target. Diffraction data are acquired by step-scanning over the angular region representing the interplanar spacing within the crystalline lattice structure of cristobalite, yielding the greatest diffracted intensity. That region ranges from 21 to 23 2θ (2-theta), with data collected in 0.05 2θ steps, counted for 20 seconds per step. The net integrated peak intensity is compared with those of standards of cristobalite prepared by the standard additions method in amorphous silica to determine the weight percent of the cristobalite phase in a sample.

The at least partially calcined composite materials disclosed herein may have a low quartz content. Quartz content may be measured by any appropriate measurement technique now known to the skilled artisan or hereafter discovered. In one exemplary method, quartz content is measured by x-ray diffraction. For example, quartz content may be measured by the same x-ray diffraction method described above for cristobalite content, except the that 2θ region ranges from 26.0 to 27.5 degrees. In some embodiments, the quartz content is less than about 0.5%. In some embodiments, the quartz content is less than about 0.25%. In some embodiments, the quartz content is less than about 0.1%. In some embodiments, the quartz content is about 0%. In some embodiments, the quartz content may be in a range from about 0% to about 0.5%. In some embodiments, the quartz content may be in a range from about 0% to about 0.25%.

The at least partially calcined composite materials disclosed herein may have a measurable pore volume. Pore volume may be measured by any appropriate measurement technique now known to the skilled artisan or hereafter discovered. In one exemplary method, pore volume is measured with an AutoPore IV 9500 series mercury porosimeter from Micromeritics Instrument Corporation (Norcross, Ga., USA), which can determine measure pore diameters in a range from 0.006 to 600 μm. As used to measure the pore volume of the composite materials disclosed herein, that porosimeter's contact angle was set at 130 degrees, and the pressure ranged from 0 to 33,000 psi. In some embodiments, the pore volume of the composition is about equal to the diatomaceous earth and/or at least one lattice interfering agent from which it is made. In some embodiments, the pore volume may be in a range from about 1 mL/g to about 10 mL/g.

In some embodiments, the pore volume may be in a range from about 4 mL/g to about 8 mL/g. In some embodiments, the pore volume may be in a range from about 4 mL/g to about 6 mL/g. In some embodiments, the pore volume is about 5 mL/g.

The at least partially calcined composite materials disclosed herein may have a measurable median pore size. Median pore size may be measured by any appropriate measurement technique now known to the skilled artisan or hereafter discovered. In one exemplary method, median pore size is measured with an AutoPore IV 9500 series mercury porosimeter, as described above. In some embodiments, the median pore size is in a range from about 1 μm to about 10 μm. In some embodiments, the median pore size is in a range from about 2 μm to about 7 μm. In some embodiments, the median pore size is in a range from about 2 μm to about 5 μm.

The at least partially calcined composite materials disclosed herein may have a measurable wet density, which as used herein refers to measurement of centrifuged wet density. According to one exemplary method, to measure wet density, a composite material sample of known weight from about 1.00 to about 2.00 g is placed in a calibrated 15 ml centrifuge tube to which deionized water is added to make up a volume of approximately 10 ml. The mixture is shaken thoroughly until all of the sample is wetted, and no powder remains. Additional deionized water is added around the top of the centrifuge tube to rinse down any mixture adhering to the side of the tube from shaking. The tube is centrifuged for 5 minutes at 2500 rpm on an IEC Centra® MP-4R centrifuge, equipped with a Model 221 swinging bucket rotor (International Equipment Company; Needham Heights, Mass., USA). Following centrifugation, the tube is carefully removed without disturbing the solids, and the level (i.e., volume) of the settled matter is measured in $cm^3$. The centrifuged wet density of powder is readily calculated by dividing the sample weight by the measured volume. In some embodiments, the wet density is in a range from about 10 $lbs/ft^3$ to about 20 $lbs/ft^3$. In some embodiments, the wet density is in a range from about 10 $lbs/ft^3$ to about 16 $lbs/ft^3$ or about 12 $lbs/ft^3$ to about 15 $lbs/ft^3$.

The at least partially calcined composite materials disclosed herein may have a measurable BET surface area. BET surface area, as used herein, refers to the technique for calculating specific surface area of physical absorption molecules according to Brunauer, Emmett, and Teller ("BET") theory. BET surface area may be measured by any appropriate measurement technique now known to the skilled artisan or hereafter discovered. In one exemplary method, BET surface area is measured with a Gemini III 2375 Surface Area Analyzer, using pure nitrogen as the sorbent gas, from Micromeritics Instrument Corporation (Norcross, Ga., USA). In some embodiments, the BET surface area is greater than for a composite material not produced according to the methods described herein (e.g., calcined without the at least one lattice interfering agent). In some embodiments, the BET surface area is in a range from about 1 $m^2/g$ to about 50 $m^2/g$. In some embodiments, the BET surface area is in a range from about 5 $m^2/g$ to about 30 $m^2/g$. In some embodiments, the BET surface area is greater than about 10 $m^2/g$.

The exemplary at least partially calcined composite materials disclosed herein may be used in any of a variety of processes, applications, and materials. For example, the composite materials may be used in at least one process, application, or material in which such a product with a high BET surface area is desirable.

For example, the at least partially calcined composite materials may be incorporated into a filter aid. A filter aid including at least one composite material may optionally include at least one additional filter aid medium. Examples of suitable additional filter aid media include, but are not limited to, natural or synthetic silicate or aluminosilicate materials, unimproved diatomaceous earth, saltwater diatomaceous earth, expanded perlite, pumicite, natural glass, cellulose, activated charcoal, feldspars, nepheline syenite, sepiolite, zeolite, and clay.

The at least one additional filter medium may be present in any appropriate amount. For example, the at least one additional filter medium may be present from about 0.01 to about 100 parts of at least one additional filter medium per part of the composite material. In some embodiments, the at least one additional filter medium is present from about 0.1 to about 10 parts. In some embodiments, the at least one additional filter medium is present from about 0.5 to 5 parts.

The filter aid may be formed into sheets, pads, cartridges, or other monolithic or aggregate media capable of being used as supports or substrates in a filter process. Considerations in the manufacture of filter aid may include a variety of parameters, including but not limited to cristobalite content, total soluble metal content of the composition, median soluble metal content of the composition, particle size distribution, pore size, cost, and availability.

A filter aid including the at least partially calcined composite material may be used in a variety of processes and compositions. In some embodiments, the filter aid is applied to a filter septum to protect it and/or to improve clarity of the liquid to be filtered in a filtration process. In some embodiments, the filter aid is added directly to a beverage to be filtered to increase flow rate and/or extend the filtration cycle. In some embodiments, the filter aid is used as pre-coating, in body feeding, or a combination of both pre-coating and body feeding, in a filtration process.

Embodiments of the at least partially calcined composite material may also be used in a variety of filtering methods. In some embodiments, the filtering method includes pre-coating at least one filter element with at least one composite material, and contacting at least one liquid to be filtered with the at least one coated filter element. In such embodiments, the contacting may include passing the liquid through the filter element. In some embodiments, the filtering method includes suspending at least one composite material filter aid in at least one liquid containing particles to be removed from the liquid, and thereafter separating the filter aid from the filtered liquid.

Filter aids including at least one of the at least partially calcined composite materials disclosed herein may also be employed to filter various types of liquids. In some embodiments, the liquid is a beverage. Exemplary beverages include, but are not limited to, vegetable-based juices, fruit juices, distilled spirits, and malt-based liquids. Exemplary malt-based liquids include, but are not limited to, beer and wine. In some embodiments, the liquid is one that tends to form haze upon chilling. In some embodiments, the liquid is a beverage that tends to form haze upon chilling. In some embodiments, the liquid is a beer. In some embodiments, the liquid is an oil. In some embodiments, the liquid is an edible oil. In some embodiments, the liquid is a fuel oil. In some embodiments, the liquid is water, including but not limited to waste water. In some embodiments, the liquid is blood. In some embodiments, the liquid is a sake. In some embodiments, the liquid is a sweetener, such as, for example, corn syrup or molasses.

The composite material disclosed herein may also be used in applications other than filtration. In some embodiments, the composite material may be used as composites in filler applications, such as, for example, fillers in construction or building materials. In some embodiments, the composite material may be used to alter the appearance and/or properties of paints, enamels, lacquers, or related coatings and finishes. In some embodiments, the composite material may be used in paper formulations and/or paper processing applications. In some embodiments, the composite material may be used to provide anti-block and/or reinforcing properties to polymers. In some embodiments, the composite material may be used as or in abrasives. In some embodiments, the composite material may be used for buffing or in buffing compositions. In some embodiments, the composite material may be used for polishing or in polishing compositions. In some embodiments, the composite material may be used in the processing and/or preparation of catalysts. In some embodiments, the composite material may be used as chromatographic supports or other support media. In some embodiments, the composite material may be blended, mixed, or otherwise combined with other ingredients to make monolithic or aggregate media useful in a variety of applications, including but not limited to supports (e.g., for microbe immobilization) and substrates (e.g., for enzyme immobilization).

EXAMPLES

A number of examples consistent with exemplary embodiments were prepared and tested to show the effects of exemplary lattice interfering agents on cristobalite formation and EBC BSI, as described below. In particular, twelve samples were prepared and at least partially calcined as described below. Table 1 below lists the content of the twelve samples, the temperature and duration for which each sample was heated-treated, and the cristobalite content of each of the resulting heat-treated samples.

TABLE 1

| DE Feed | Additive ID | % Additive | Temp (° C.) | time (min.) | Cristobalite % |
|---|---|---|---|---|---|
| 1. DE Feed | none | 0 | 1100 | 30 | 13.7 |
| 2. DE Feed | soda ash | 5.2 | 1100 | 30 | 27.4 |
| 3. DE Feed | Al(OH)$_3$•nH$_2$O | 20.0 | 1100 | 30 | 8.8 |
| 4. DE Feed | Al$_2$O$_3$ | 20.6 | 1100 | 30 | 11.1 |
| 5. DE Feed | fine perlite ore | 20.0 | 1100 | 30 | 6.7 |
| 6. DE Feed | fine perlite ore | 27.3 | 1100 | 30 | 1.6 |
| 7. DE Feed | nepheline syenite | 20.6 | 1100 | 30 | 1.4 |
| 8. DE Feed | perlite (25 micron) | 20.2 | 1100 | 30 | 2.2 |
| 9. DE Feed | Sara Kaolin | 20.3 | 1100 | 30 | 6.5 |
| 10. DE Feed | Kansas Ash Crude | 21.1 | 1100 | 30 | 2.8 |
| 11. DE Feed | TiO$_2$, Anatase | 20.3 | 1100 | 30 | 1.3 |
| 12. DE Feed | TiO$_2$, Rutile | 20.5 | 1100 | 30 | 7.4 |

FIGS. 1-8 are graphs relating to the testing of samples 1-12. FIG. 1 shows the cristobalite content following calcination of the diatomaceous earth feed when combined with different amounts of fine perlite ore (PA 3500). The calcinations were performed at 1100° C. for 30 minutes. As shown in FIG. 1, the addition of fine perlite ore results in reduced cristobalite formation, with the addition of more fine perlite ore further reducing the amount of cristobalite.

Figure 2:
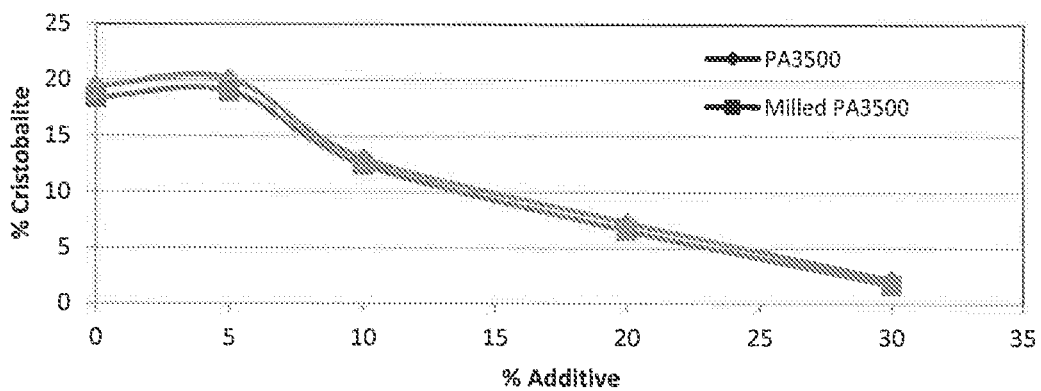
FIG. 2 is a graph showing the effect of fine perlite ore on cristobalite formation when heat treating exemplary diatomaceous earth samples.

FIG. 2 shows the cristobalite content following calcination of the diatomaceous earth feed when combined with different amounts of fine perlite ore (PA3500). The calcinations were performed at 1100° C. for 30 minutes. As shown in FIG. 2, the addition of fine perlite ore (milled or unmilled) results in reduced cristobalite formation, with the addition of finer perlite ore further reducing the amount of cristobalite.

Figure 3:
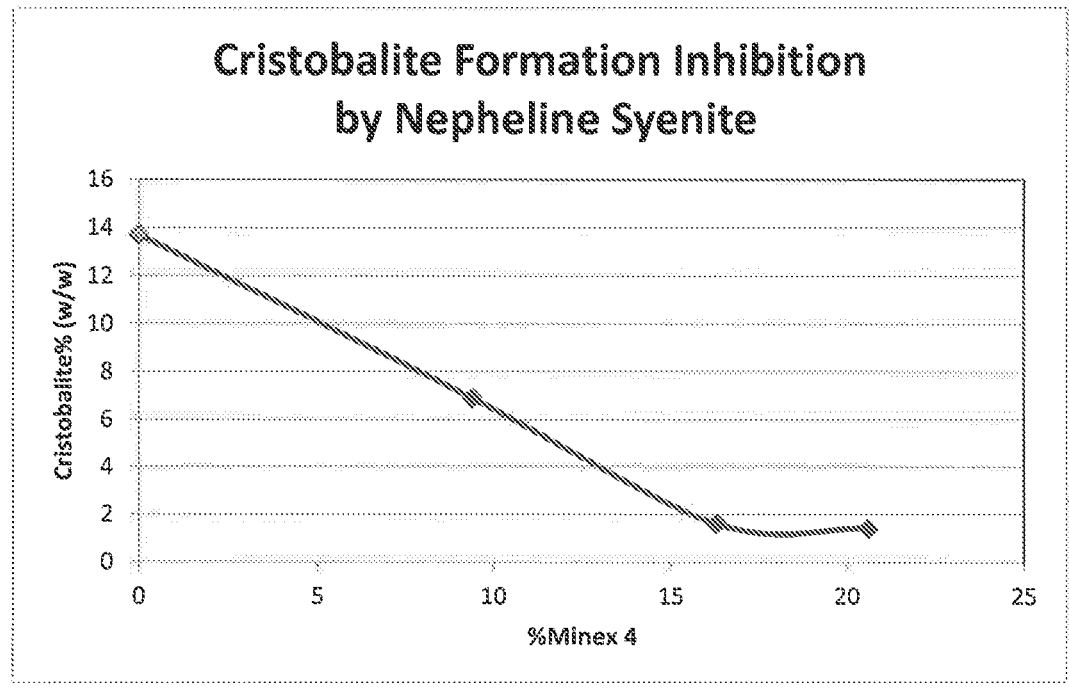
FIG. 3 is a graph showing the effect of nepheline syenite on cristobalite formation when heat treating exemplary diatomaceous earth samples.

FIG. 3 shows the cristobalite content following calcination of the diatomaceous earth feed combined with different amounts of fine nepheline syenite (Minex 4). The calcinations were performed at 1100° C. for 30 minutes. As shown in FIG. 3, the addition of fine nepheline syenite results in reduced cristobalite formation, with the addition of more fine nepheline syenite further reducing the amount of cristobalite.

Figure 4:
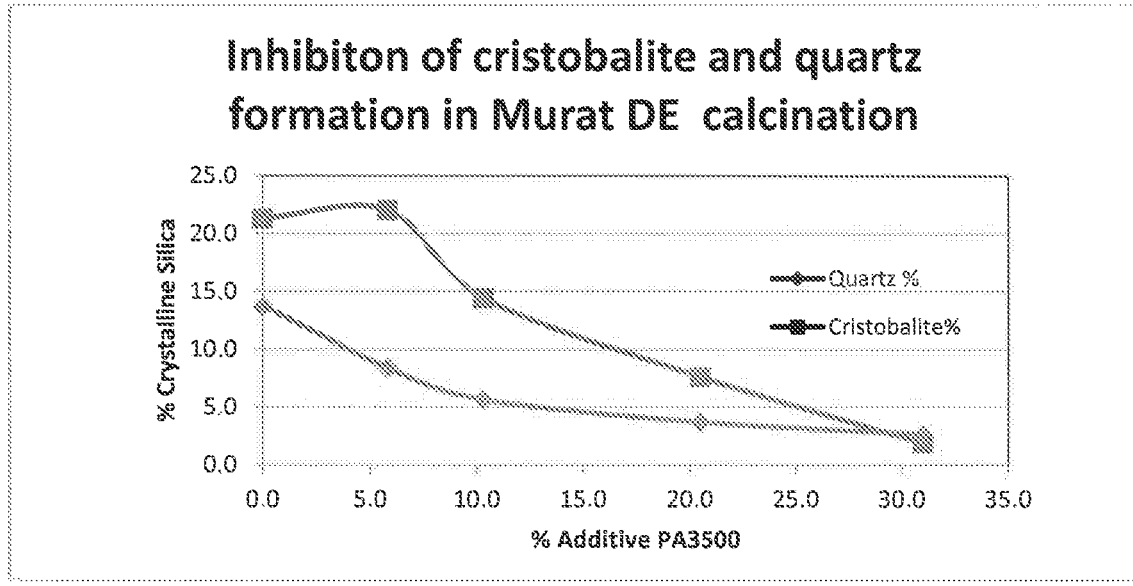
FIG. 4 is a graph showing the effect of fine perlite ore on cristobalite and quartz formation when heat treating exemplary diatomaceous earth samples.

FIG. 4 shows the cristobalite and quartz content following calcination of the diatomaceous earth feed combined with different amounts of puck-milled, fine perlite ore (PA3500). The calcinations were performed at 1100° C. for 30 minutes. As shown in FIG. 4, the addition of puck-milled, fine perlite ore results in reduced cristobalite and quartz formation, with the addition of more fine perlite ore further reducing the amount of cristobalite and quartz. This shows that the perlite ore interferes with the formation of both cristobalite and quartz.

Figure 5:
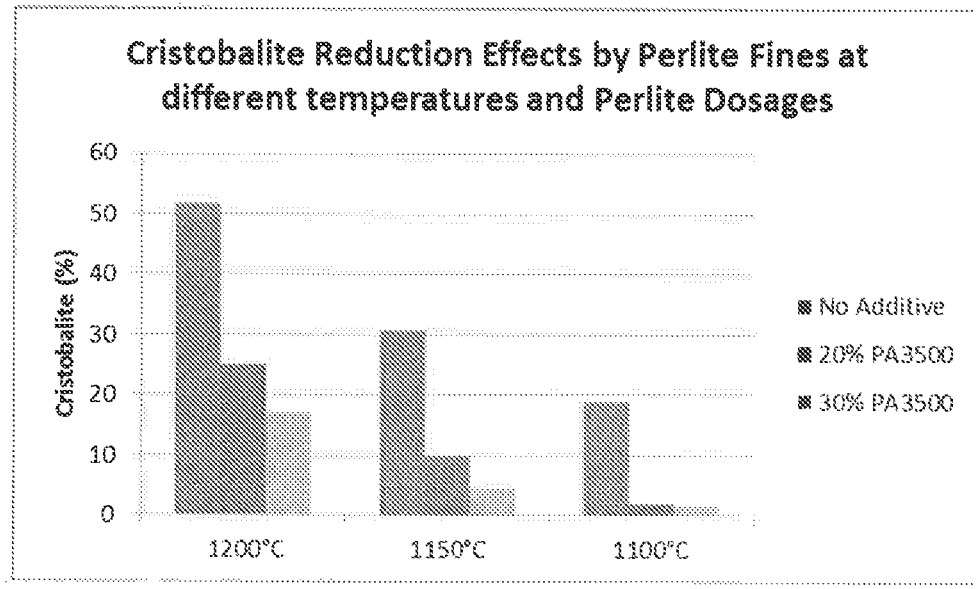
FIG. 5 is a bar graph showing the effect of fine perlite ore and calcination temperature on cristobalite formation when heat treating exemplary diatomaceous earth samples.
Figure 6:
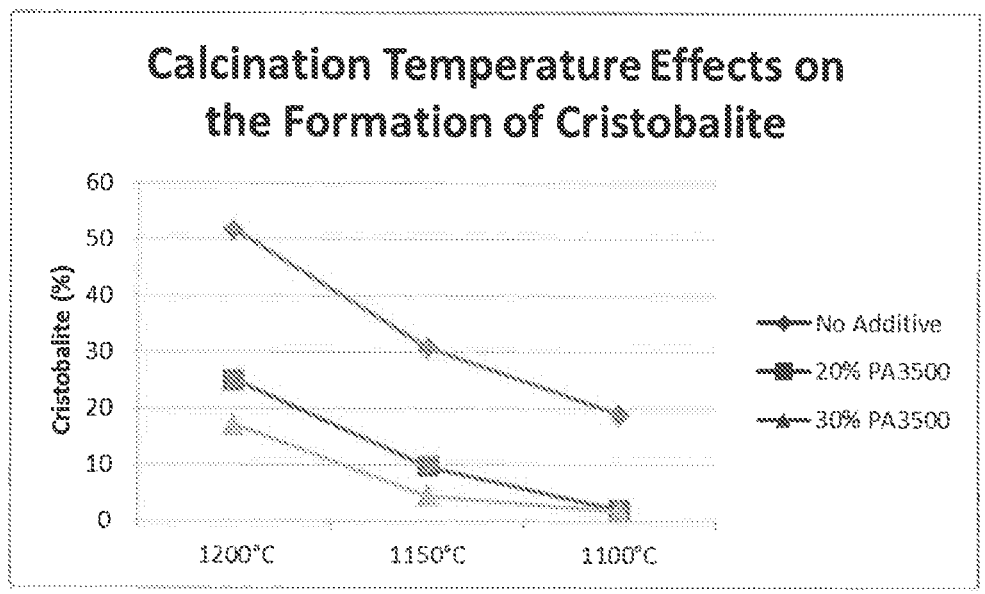
FIG. 6 is a graph showing the effect of fine perlite ore and calcination temperature on cristobalite formation when heat treating exemplary diatomaceous earth samples.

FIGS. 5 and 6 show the effects of calcination at different temperatures on cristobalite formation and with different samples, with a calcination duration of 30 minutes. As shown in FIGS. 5 and 6, when the calcination temperature is less than 1100° C., and in the range of 1000° C. to 1100° C. for 30 minutes, the lattice interfering agents (fine perlite ore) showed the strongest cristobalite inhibition effects. These temperature ranges and the duration of heat-treatment (30 minutes) are consistent with typical ranges of DE calcination processing.

Figure 7:
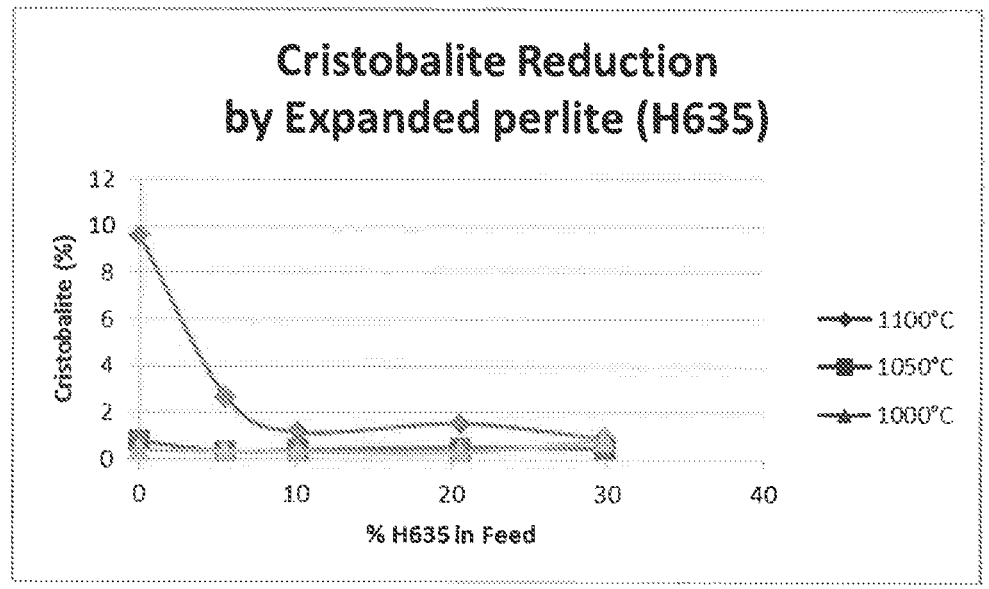
FIG. 7 is a graph showing the effect of expanded perlite on cristobalite formation when heat treating exemplary diatomaceous earth samples.

FIG. 7 shows cristobalite content (reduction) following calcination of the diatomaceous earth feed combined with different amounts of expanded perlite (H635) at different temperatures. The calcinations were performed for 30 minutes at the temperatures indicated. As shown in FIG. 7, the amount of lattice interfering agent has more effect at a calcination temperature of 1100° C. than the other temperatures tested, 1000° C. and 1050° C.

Figure 8:
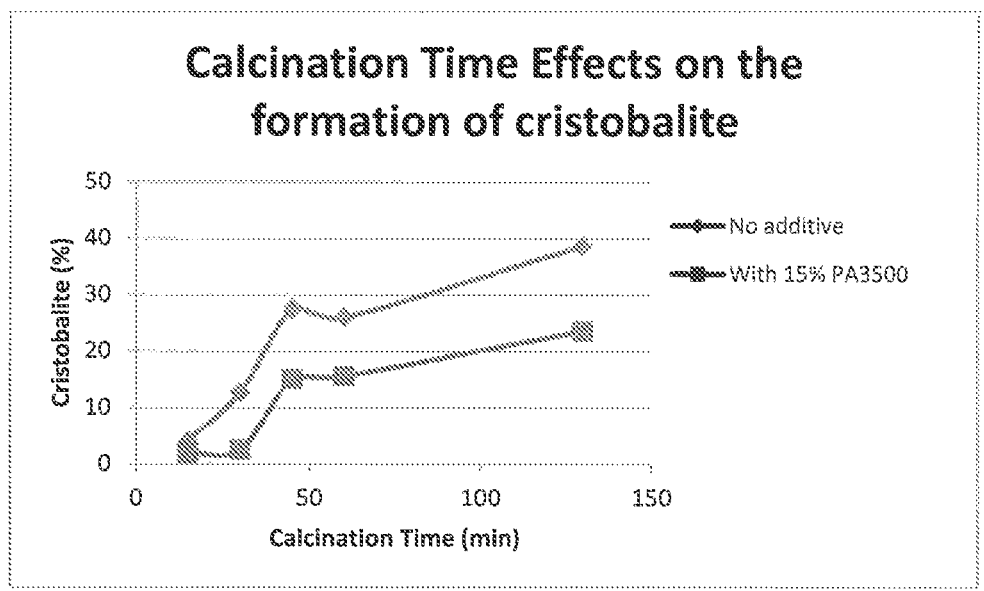
FIG. 8 is a graph showing the effect of fine perlite ore and calcination duration on cristobalite formation when heat treating exemplary diatomaceous earth samples.

FIG. 8 shows cristobalite content following calcination of the diatomaceous earth feed, either alone or combined with fine perlite ore (PS3500), for different durations of heat-treatment. The calcinations were performed at 1100° C. AS shown in FIG. 8, the longer the duration, the more cristobalite formed, with less cristobalite being formed when the diatomaceous earth is combined with fine perlite ore.

Table 2 below shows the cristobalite content following calcination of the diatomaceous earth feed, when combined with a soda ash, nepheline syenite, soda ash and kaolin, or soda ash and alumina gel. The calcination was performed at 1000° C. for 30 minutes. When combined the diatomaceous earth is combined solely with soda ash, the cristobalite is significantly higher, relative to when the diatomaceous earth and soda sash are combined with nepheline syenite, kaolin, or alumina gel before calcination.

TABLE 2

| Sample Description | Cristobalite (%) | EBC BSI (ppm) |
|---|---|---|
| Diatomaceous earth and 5% soda ash | 13.3 | 139.3 |
| Diatomaceous earth and 5% nepheline syenite | 2.33 | 71.1 |
| Diatomaceous earth, 5% soda ash, and 20% kaolin | 1.21 | 59.9 |
| Diatomaceous earth, 5% soda ash, and 5% alumina gel | 1.8 | 99.7 |

Table 3 shows the reduction of cristobalite and EBC BSI after straight calcination of DE and aluminum compound feeds. The calcination for samples 13-20 was performed at 1100° C. for thirty minutes, and the calcined product dispersed through 30 mesh sieve before measurements. Table 3 shows the effects of selected additives on the formation of cristobalite and BSI measured according to EBC. For flux-calcination, because of the use of soda ash, the formation of cristobalite is significantly increased, and the cristobalite formation reduction effect by using lattice interfering agents is reduced. However, the reduction effects of EBC BSI is significant.

TABLE 3

| Sample Description | Soda ash % | Cristobalite % | EBC BSI (ppm) |
|---|---|---|---|
| 13. DE Feed | 0 | 13.7 | 48.7 |
| 14. DE Feed, 16.30% nepheline syenite | 0 | 1.6 | 28.7 |
| 15. DE Feed, 9.39% nepheline syenite | 0 | 6.9 | 34.2 |
| 16. DE Feed, 10.5% perlite (25 micron) | 0 | 3.7 | 36.5 |
| 17. DE Feed, 23.83% fine perlite ore waste | 0 | 0.6 | 28.7 |
| 18. DE Feed, 17.80% fine perlite ore waste | 0 | 2.0 | 32.1 |
| 19. DE Feed, 9.95% fine perlite ore waste | 0 | 3.2 | 36.7 |
| 20. DE Feed, 5.64% fine perlite ore waste | 0 | 3.2 | 40.3 |

Table 4 bellow shows the reduction effects, not only for EBC BSI, but also noticeably for EBC BSAI (beer soluble aluminum). The reduction on EBC BSAI is significant. This is because the aluminum-containing additives used are low in soluble aluminum, and when calcined with DE materials, the soluble aluminum from the DE can be largely affixed onto the surfaces through the reactions of the "lattice interfering agent."

TABLE 4

| Sample ID | Cristobalite % | EBC BSI(ppm) | EBC BSAI(ppm) | EBC BSCa(ppm) |
|---|---|---|---|---|
| DE Feed | 13.7 | 49 | 115 | 231 |
| DE Feed with 16.3% Minex4, Nepheline Syenite | 1.3 | 31 | 49 | 211 |
| DE Feed with 23.8% PA3500 Perlite Fines | 0.6 | 30 | 67 | 203 |
| DE Feed with 24.4% PA3500 Perlite Fines | 1.9 | 28 | 67 | 209 |
| DE Feed with 20.6% Al2O3 Powder | 1.6 | 25 | 54 | 151 |
| DE Feed with 20% PA3500 Perlite Fines | 1.4 | 28 | 47 | 181 |

Table 5 below shows the EBC BSI reduction effects for samples 21-28 of using lattice interfering agents. The calcination for samples 21-28 was performed at 1100° C. for thirty minutes.

TABLE 5

| Sample Description | Soda ash % | Cristobalite % | EBC BSI (ppm) | % EBC BSI Reduction |
|---|---|---|---|---|
| 21. DE Feed, 5.19% soda ash | 5.2 | 27.4 | 75.6 | |
| 22. DE Feed, 9.23% cristal-active anatase | 5.0 | 25.0 | 33.9 | 55 |
| 23. DE Feed, 9.37% Dupont TiO$_2$ Rutile | 4.7 | 20.7 | 42.6 | 44 |
| 24. DE Feed, 9.68% Al(OH)$_3$·3H$_2$O | 5.9 | 24.9 | 23.7 | 69 |
| 25. DE Feed, 6.47% Al$_2$O$_3$ | 5.9 | 27.3 | 49.6 | 34 |
| 26. DE Feed, 11.59% nepheline syenite | 5.5 | 20.1 | 29.8 | 61 |
| 27. DE Feed, 9.6% perlite (25 micron) | 4.6 | 25.6 | 49.7 | 34 |
| 28. DE Feed, 12.81% fine perlite ore waste | 4.7 | 22.7 | 59.8 | 21 |

Figure 9:
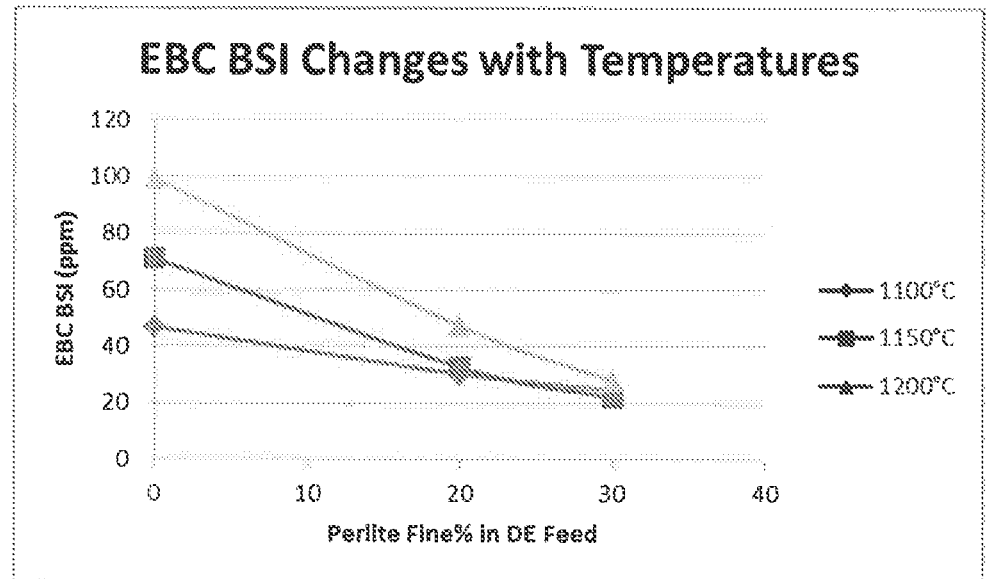
FIG. 9 is a graph showing the effect of fine perlite ore and calcination temperature on EBC beer soluble Iron (BSI) when heat treating exemplary diatomaceous earth samples.
Figure 10:
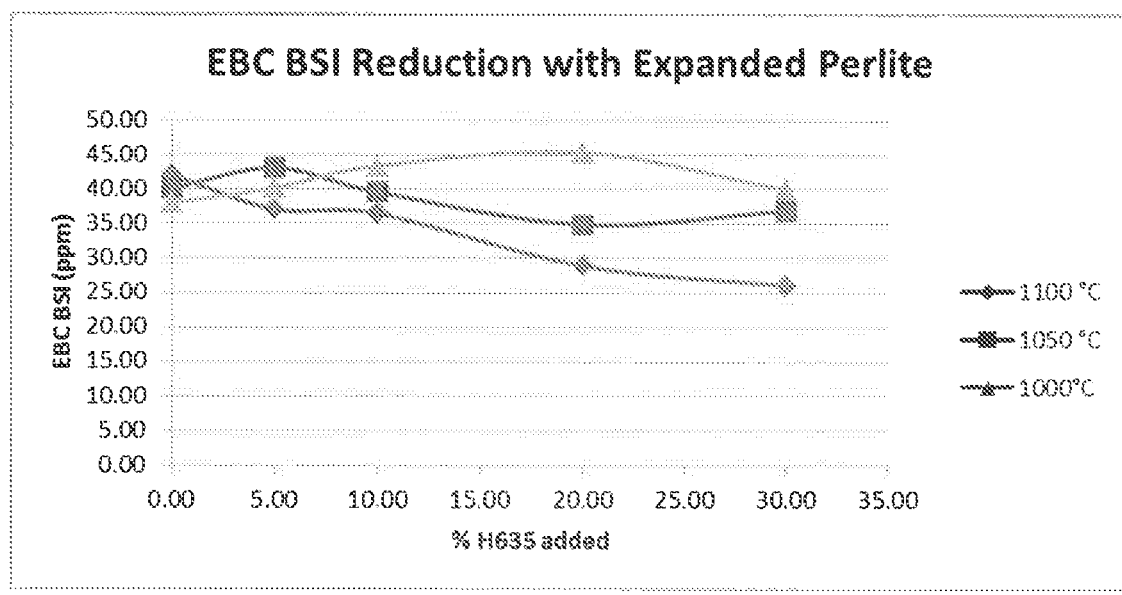
FIG. 10 is a graph showing the effect of expanded perlite and calcination temperature on EBC BSI when heat treating exemplary diatomaceous earth samples.

The EBC BSI reduction effects are influenced by calcination temperatures and the amount of lattice interfering agent used. As shown in FIG. 9, the EBC BSI reduction effect by perlite fines is increased with the increase in temperature and the amount of perlite fine in the calcination feeds. FIG. 10 shows the EBC BSI reduction effects of using expanded and milled perlite (Harborlite 635). As shown in FIG. 9, the higher the temperature and the amount of perlite fines used, the more reduction of EBC BSI is achieved. However, FIG. 10 shows that with relatively more coarse expanded perlite (Harborlite 635), the temperature and the amount of perlite added has less of an effect. Without wishing to be bound by theory, it is believe that due to the relatively coarse particle size of the expanded perlite, the EBC BSI reduction effect is not as strong as the with the fine perlite ore.

Figure 11:
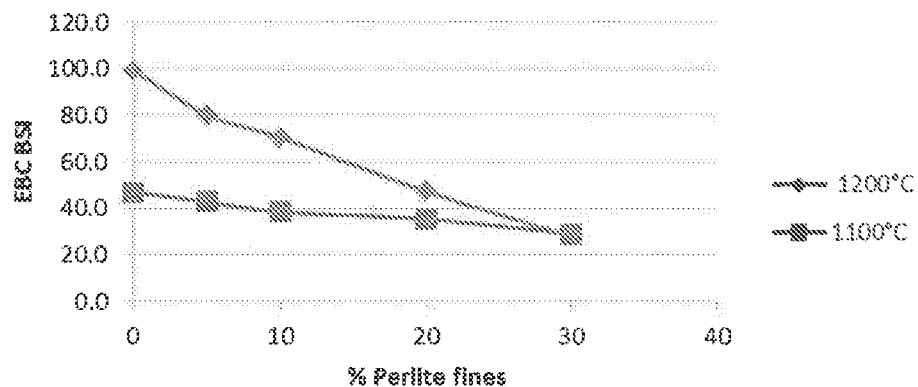
FIG. 11 is a graph showing the effect of fine perlite ore and calcination temperature on EBC BSI when heat treating exemplary diatomaceous earth samples.
Figure 12:
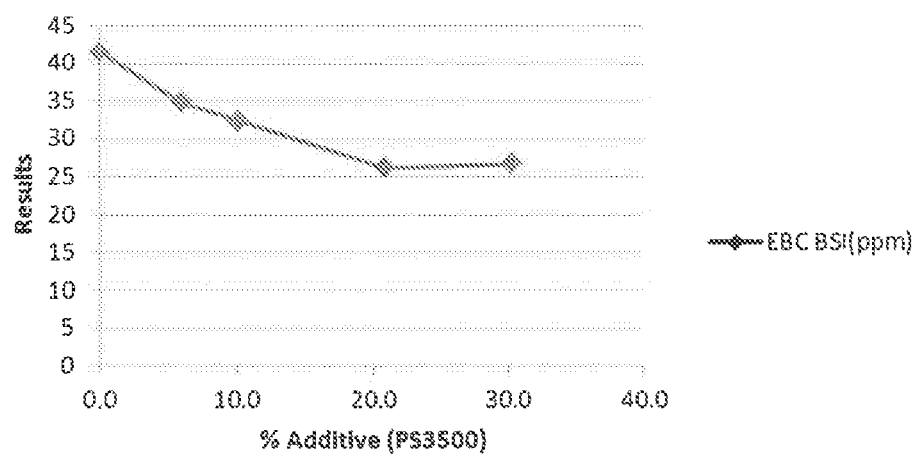
FIG. 12 is a graph showing the effect of fine perlite ore on EBC BSI when heat treating exemplary diatomaceous earth samples.

FIGS. 11 and 12 show more examples of EBC BSI reduction as a result of exemplary lattice interfering agents including fine perlite ore. FIG. 11 shows a reduction of EBC BSI with increases in the amount of fine perlite ore at both 1100° C. and 1200° C. FIG. 12 also shows a reduction of EBC BSI with increases in the amount of fine perlite ore.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of calcining diatomaceous earth, the method comprising:
    adding at least one lattice interfering agent to the diatomaceous earth to form a composite material; and
    heating the composite material at a temperature of at least about 800° C. for at least about 15 minutes to form an at least partially calcined composite material,
    wherein the at least one lattice interfering agent comprises at least one cation of at least one of aluminum and titanium; and
    wherein the at least partially calcined composite material comprises a beer soluble iron content of less than 100 parts per million as measured according to the European Brewing Convention method.

2. The method of claim 1, wherein the at least one lattice interfering agent comprises at least one of alumina, nepheline syenite, perlite, kaolin, bauxite, feldspar, clays, and other natural and synthetic aluminum-containing compounds.

3. The method of claim 1, wherein the at least one lattice interfering agent comprises at least one of titanium oxide, rutile, anatase, and other natural and synthetic titanium-containing compounds.

4. The method of claim 1, further comprising mixing the at least one lattice interfering agent and the diatomaceous earth.

5. The method of claim 4, wherein the at least one lattice interfering agent and the diatomaceous earth are in dry particulate form during the mixing.

6. The method of claim 1, wherein the composite material is not spray-dried before heating.

7. The method of claim 1, wherein the at least one lattice interfering agent ranges from 1 wt % to 50 wt % of the composite material.

8. The method of claim 1, wherein the at least partially calcined composite material comprises less than 15 wt % cristobalite.

9. The method of claim 1, wherein heating the composite material comprises heating the composite material at a temperature of at least about 1,000° C. for at least about 15 minutes to form the at least partially calcined composite material.

10. A diatomaceous earth product comprising the at least partially calcined composite material formed from the method of claim 1.

11. A filter aid comprising the diatomaceous earth product of claim 10.

12. A method of calcining diatomaceous earth, the method comprising:
    adding at least one lattice interfering agent to the diatomaceous earth to form a composite material; and
    heating the composite material at a temperature of at least about 800° C. for at least about 15 minutes to form an at least partially calcined composite material,
    wherein the at least one lattice interfering agent comprises at least one cation of at least one of aluminum and titanium; and
    wherein the at least partially calcined composite material comprises a beer soluble arsenic content of less than 5 parts per million as measured according to the European Brewing Convention method.

13. A method of calcining diatomaceous earth, the method comprising:
    adding at least one lattice interfering agent to the diatomaceous earth to form a composite material; and
    heating the composite material at a temperature of at least about 800° C. for at least about 15 minutes to form an at least partially calcined composite material,
    wherein the at least one lattice interfering agent comprises at least one cation of at least one of aluminum and titanium; and
    wherein the at least partially calcined composite material comprises a beer soluble aluminum content of less than 30 parts per million as measured according to the European Brewing Convention method.

14. A method of calcining diatomaceous earth, the method comprising:
    adding at least one lattice interfering agent to the diatomaceous earth to form a composite material; and
    heating the composite material at a temperature of at least about 800° C. for at least about 15 minutes to form an at least partially calcined composite material,
    wherein the at least one lattice interfering agent comprises at least one cation of at least one of aluminum and titanium; and
    wherein the at least partially calcined composite material comprises a beer soluble calcium content of less than 200 parts per million as measured according to the European Brewing Convention method.

* * * * *